Dec. 12, 1967  G. SIRACUSA  3,357,380
GARBAGE DISPOSAL SYSTEM
Filed Dec. 22, 1965  3 Sheets-Sheet 1
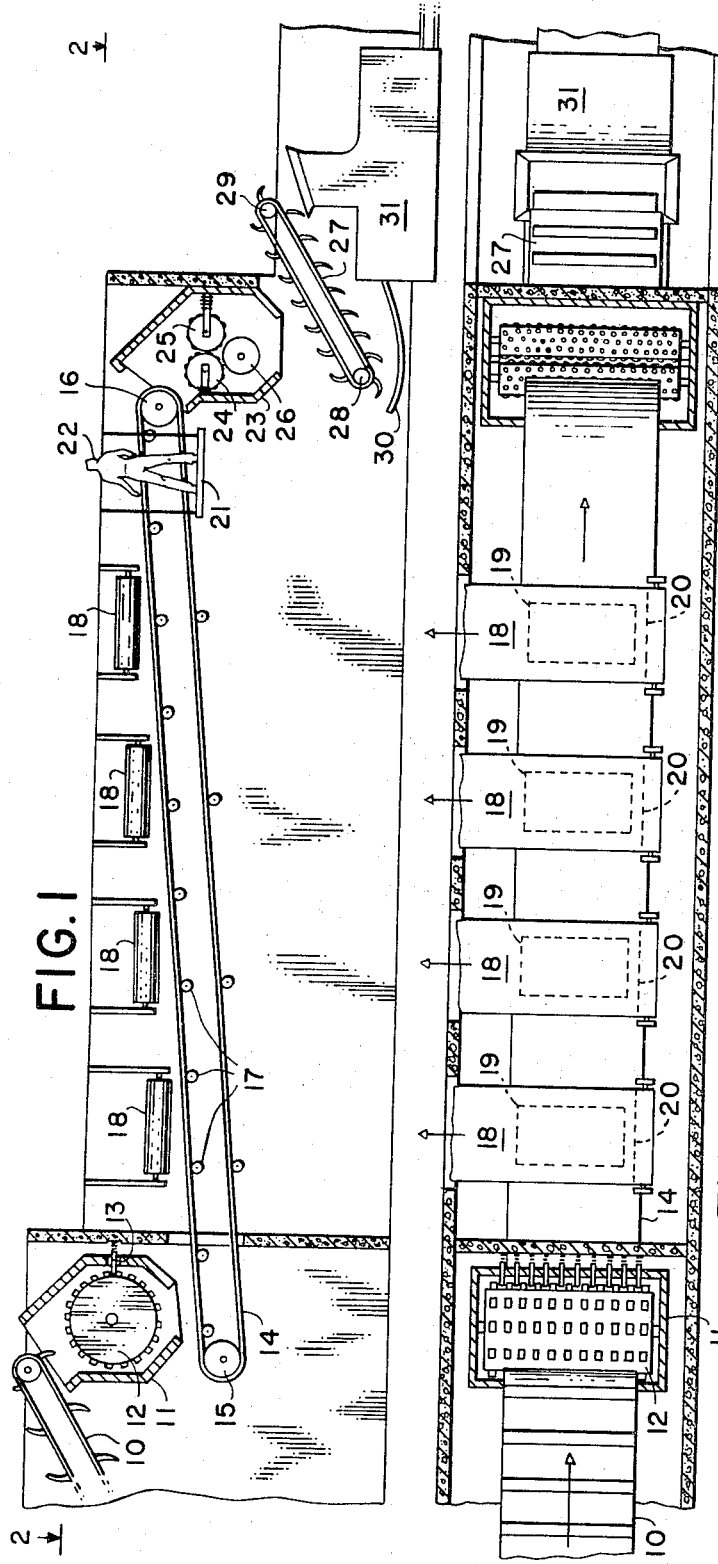
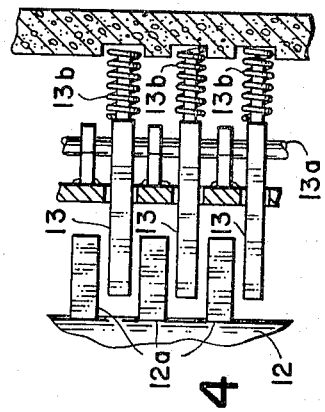
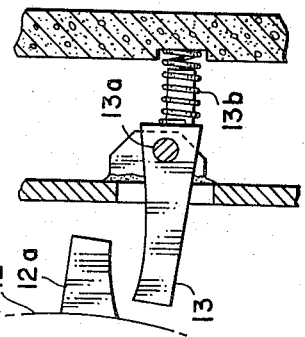
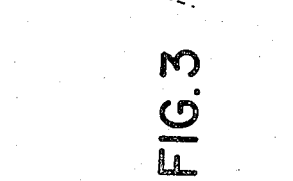
INVENTOR
GIANNI SIRACUSA
BY
*Allen and Allen*
ATTORNEYS Dec. 12, 1967 G. SIRACUSA 3,357,380
GARBAGE DISPOSAL SYSTEM
Filed Dec. 22, 1965 3 Sheets-Sheet 2
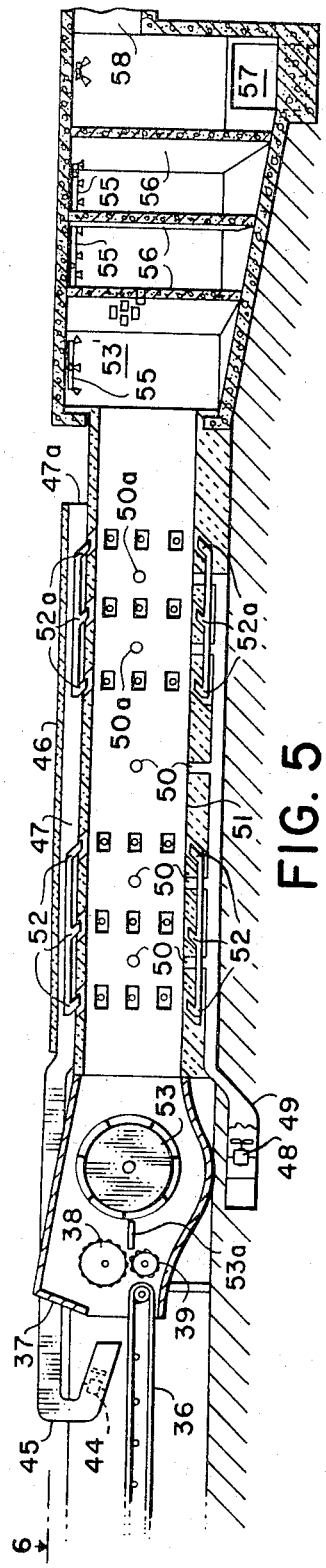
FIG. 5
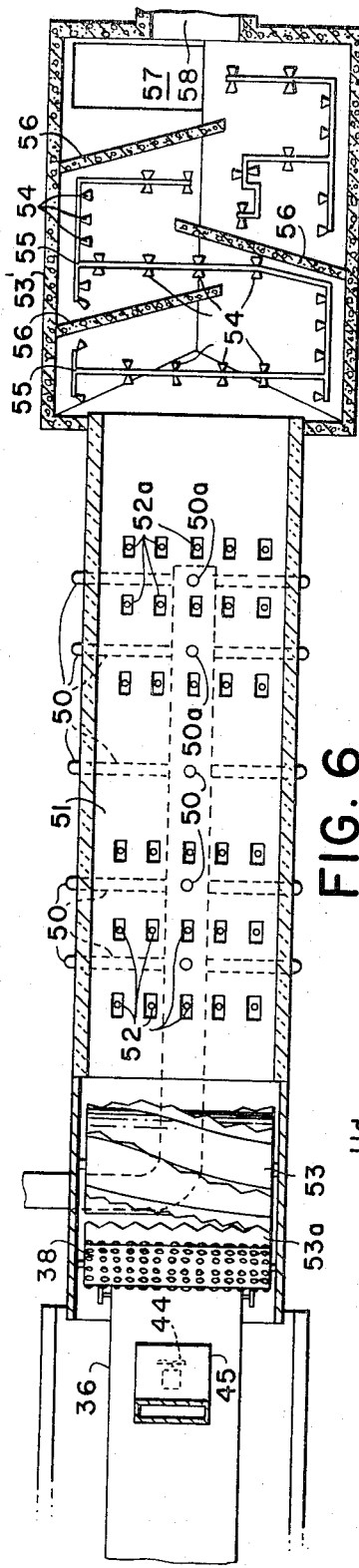
FIG. 6
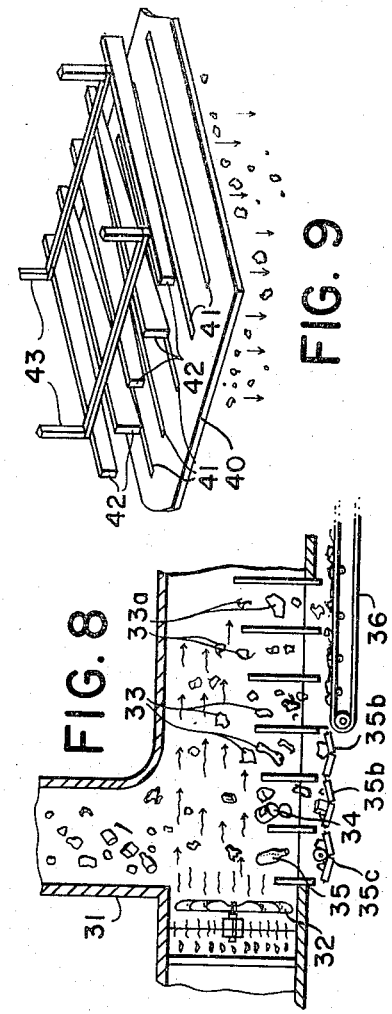
FIG. 9
FIG. 8
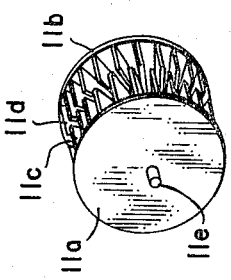
FIG. 7
INVENTOR
GIANNI SIRACUSA
BY
ATTORNEYS

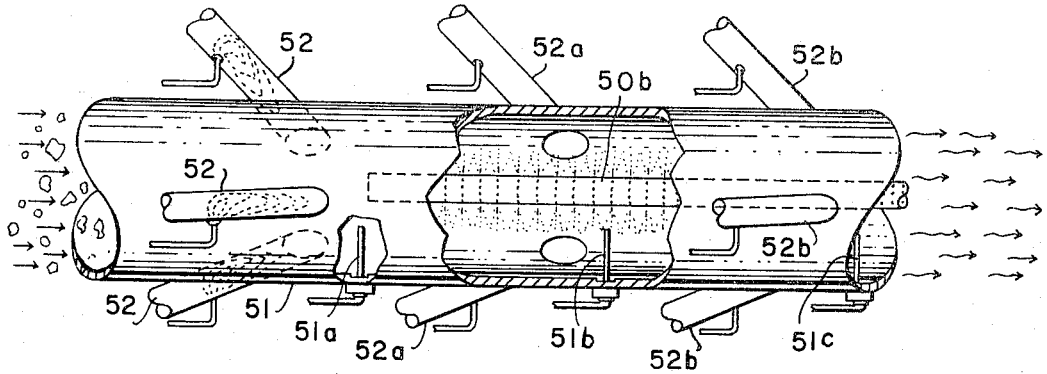
FIG. 10
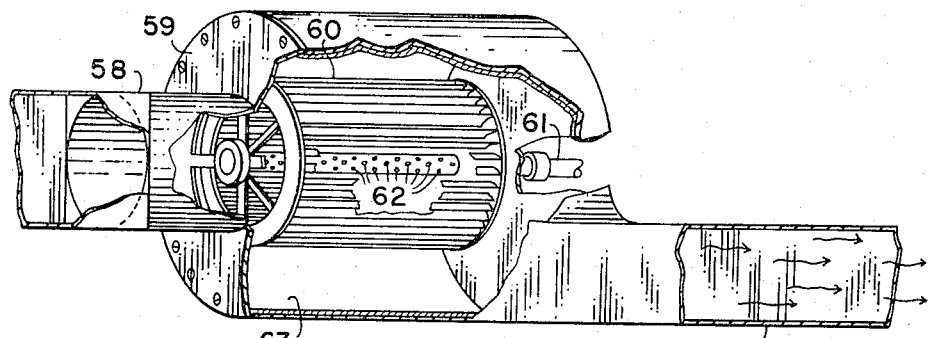
FIG. 11
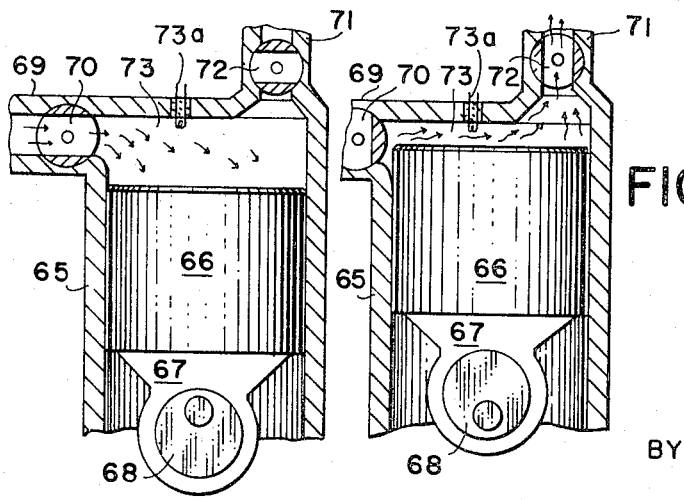
FIG. 12
FIG. 13

United States Patent Office 3,357,380
Patented Dec. 12, 1967

3,357,380
GARBAGE DISPOSAL SYSTEM
Gianni Siracusa, 100 Mary Way,
Los Gatos, Calif. 95030
Filed Dec. 22, 1965, Ser. No. 515,567
4 Claims. (Cl. 110—8)

ABSTRACT OF THE DISCLOSURE

A method and apparatus for disposing of refuse such as garbage in which the garbage is first loosened to break it up so that some of the noncombustible material such is iron may be removed therefrom by suitable magnets. The garbage is then compressed and crushed to squeeze therefrom a large part of the liquid contained therein. The garbage is then shredded to reduce it to small particles so that any remaining moisture trapped therein may be readily driven out in the subsequent burning thereof. The small particles of refuse are then blown by a stream of air into the burning zone of an incinerator in which they are burned while in suspension with sufficient air so that the combustion is complete. The air stream through the incinerator produces a draft which carries the smoke and fine ash from the incinerator into a washing chamber having a serpentine path therethrough in which the smoke and ash are washed by water sprays.

---

This invention relates to apparatus and method for disposing of garbage refuse and the like waste material.

An object of this invention is to provide an improved apparatus and method for disposing of garbage refuse and similar waste without polution of water supplies and air or atmosphere.

Another object of this invention is to provide an improved apparatus and method for disposing of garbage refuse and other waste material in an efficient and economical manner with a minimum of manual labor such that this apparatus and method may be feasible for use by both large and small communities, also private establishments.

Still another object of this invention is to provide an improved apparatus and method for disposing of combustible garbage refuse and other waste material by reducing the material to small particles which are propelled through an incinerator for complete combustion thereof and thereafter washing the gases and fine ash from the products of combustion from said incinerator.

Another object of this invention is to provide an improved apparatus and method for garbage and other waste disposal from which the glass bottles and metallic objects such as cans are removed prior to reduction of the waste to fine particles which are propelled through an incinerator and completely burned in said incinerator, the gases and fine ash effluent from said incinerator being passed through a washer so that the ash and soluble gases are washed therefrom so that only carbon dioxide resulting from the complete combustion, in addition to constituents of the air not used in combustion, are released to the outer atmosphere.

Other and further objects of this invention will be apparent to those skilled in the art to which it relates from the following specification, claims and drawing in which, briefly:

FIG. 1 is a side view of the separator stages of this refuse handling apparatus;

FIG. 2 is a plan view of the apparatus shown in FIG. 1;

FIG. 3 is a fragmentary detail view of cutting teeth of the masticator employed in the first part of the apparatus shown in FIG. 1;

FIG. 4 is another fragmentary plan view of the cutting teeth shown in FIG. 3;

FIG. 5 is a sectional view in side elevation of the shredder, incinerator and washer stages of this apparatus;

FIG. 6 is a plan view of the stages shown in FIG. 5;

FIG. 7 is an alternative form of masticator adapted to be employed in the apparatus shown in FIGS. 1 and 2;

FIG. 8 is a sectional view of a blower operated refuse separator shown in FIGS. 1 and 2;

FIG. 9 is a detail view of a punch-type cutter which may be employed in the shredder stage of the apparatus shown in FIG. 5;

FIG. 10 is a detail view of one stage of a modified incinerator which may be employed in the apparatus shown in FIG. 5;

FIG. 11 is an impeller separator stage that is adapted to receive the gaseous effluent from the water which may contain some solid material that is not deposited in the washer and which solid material is collected in the absorbent liner of the impeller; and FIGS. 12 and 13 are sectional views of a large compressor in which the reduced refuse is compressed together with combustible gas preparatory to the burning thereof.

Referring to the drawing in detail, reference numeral 10 designates a conveyor which is adapted to receive the garbage, refuse or other waste material from a truck or other garbage or waste transporting vehicle (not shown). The conveyor 10 of conventional construction is driven by a suitable motor so that the waste material dumped thereon is carried thereby and fed to the masticator 11. The masticator 11 is provided with a motor driven massive roller 12 having teeth or spikes 12a, as shown in FIG. 3, attached thereto on the outer surface thereof. A plurality of rows of these spikes 12a is provided to the roller 12, as shown in FIG. 4, and these are arranged so that they pass between mating stationary teeth 13 which are pivotally attached to the wall of the masticator by pivoting rod 13a. Biasing springs 13b may be provided to each of these stationary teeth so that they will yield if dense objects such as iron rods or the like are fed to the masticator and let these objects through without damaging the teeth.

The masticator 11 loosens and breaks up the waste material and at the same time shears and reduces the size of the various objects in the waste. The loosened and broken waste is dumped on the conveyor 14 which is supported by the rollers 15 and 16, one of which is motor driven. Bars 17 are positioned at spaced intervals under the conveyor 14 to support the conveyor and load thereon. The conveyor 14 carries the waste material under the conveyors 18 which are disposed transversely of conveyor 14 and at spaced distances above the upper surface of conveyor 14. Suitable electromagnets or permanent magnets 19 of conventional construction are positioned between the upper and lower webs of each of the conveyors 18.

The pulleys 20 supporting one end of each of these conveyors, as shown in FIG. 2, may also be made of magnetic material so that these pulleys may be magnetized by the magnets 19. Thus, the waste material carried by the conveyor 14 under the conveyors 18 is subjected to the action of relatively strong magnetic fields produced by the magnets 19, and magnetic material in the waste is drawn up to the lower webs of conveyor 18. These conveyors are moved in the direction indicated by the arrows shown in FIG. 2 and the magnetic waste material adhering to the bottom web thereof is moved up around pulleys 20 and over the top web thereof. These conveyors thus function to move the magnetic waste material off to the side of the main conveyor 14 where it is dumped after it is moved past the influence of the magnets 19. The magnetic waste is dumped into a suitable receptacle (not shown).

A suitable platform 21 is provided near the outlet end of conveyor 14 and this platform is occupied by the attendant 22 who inspects the waste material to pick out any foreign objects such as metal, glass or the like present in the waste before such waste is dumped into the crusher 23.

In FIG. 7 there is shown an alternative construction for a masticator that may be used in place of that shown in FIGS. 1 to 4. This arrangement is provided with two discs 11a and 11b which are provided with vanes 11c and 11d, respectively, attached thereto and facing each other. The discs 11a and 11b may be supported by suitable shafts such as the shaft 11e supporting disc 11a, and suitable motors (not shown) may be provided to drive the discs in opposite directions. Thus, the waste dumped on the vanes 11c and 11d from above is subjected to shearing action and the size of any large waste object is reduced.

The crusher 23, shown in FIGS. 1 and 2, is provided with two motor driven rollers 24 and 25 which are studded with blunt projections and function to extract liquids present in the refuse or waste and further break up the size of the pieces thereof. Rollers 24 and 25 are positioned close to each other so that the studs thereof interleave as the rollers are driven and they squeeze the refuse therebetween to extract the liquid therefrom. The liquid drains down through the open bottom of the crusher 23 and may be collected in an inclined trough 30 leading to a suitable reservoir. The compressed refuse is fed to the roller 26 which is driven at a relatively high speed compared to the speed of the rollers 24 and 25. Roller 26 is provided with a serrated surface to engage the squeezed refuse and loosen or fluff it before it is passed to the conveyor 27. Conveyor 27 is of foraminiferous material so that the liquid dropping from the rollers 24 and 25 of the crusher 23 may drain down therethrough to the trough 30 which is connected to a tank (not shown) in which these liquids are collected for further use and treatment such as fermentation, if desired.

Rollers 28 and 29, one of which is motor driven, are provided to support the conveyor 27 and move this conveyor and the load of refuse thereon to the separator 31. The separator 31 is provided with a blower 32, shown in FIG. 8, and the refuse is dropped into this apparatus through a chute from above. As the refuse passes in front of the blower 32, the blast of air, which is preferably heated, acts on the mass of crushed and fluffed refuse and blows it forward various distances, depending on the type of material. Thus, the fluffier and lighter particles of refuse are blown to the compartments more remote from the blower, whereas, the heavy materials which may be of metal, glass and the like drop into the compartments that are closer to the blower. Conveyors are positioned below these compartments so that the separated materials are moved to suitable reservoirs or receptacles or to other devices for further processing, as will be described.

In another arrangement of this invention the separator 31, shown in FIG. 8, may be employed in place of the magnetic separators 18 and the manual separation station 21. In that case, the output of the masticator 12 is dumped directly into the input chute of the separator 31.

In this arrangement it is preferable to pass the refuse through a preheater, either before it is passed to the masticator 11 or immediately thereafter, so that articles such as paper, cardboard and the like are subjected to a drying action before the waste material is fed to the separator 31 to facilitate the separation of paper, cardboard and the like from vegetable refuse such as orange and banana peels, corn cobs, etc. and glass bottles and metal cans. These materials all have different densities and are subjected to the air blast from the blower 32 and propelled to the different compartments 33, 34 and 35. Thus, the glass bottles because of their density enter the first compartment 35, the metal cans enter the compartment 34, vegetable refuse enters compartments 33 and the paper and cardboard enter compartments 33a. Channel-shaped conveyors 35a and 35b are provided under receptacles 35 and 34, respectively, for receiving the glass and metal refuse dropping downward through these compartments and moving it to suitable reservoirs. Conveyor 36 is provided for receiving the refuse from compartments 33 and 33a and moving this refuse to the shredder 37. However, if desired, a separate conveyor may be provided to receive the vegetable refuse from compartments 33 to carry this refuse to squeezer rollers such as rollers 24 and 25. On the other hand, where both paper and vegetable refuse of a soggy nature is being handled, then all of it may be passed through the squeezer rollers to press as much moisture as possible from it before feeding the refuse to the shredder 37. The squeezed pulp is then passed to the shredder roller 26 which disintegrates it and the material is then dropped onto conveyor 27 while the liquid drops down to conveyor 30. Conveyor 27 then dumps the refuse onto conveyor 36 which carries both the vegetable refuse and the paper refuse to the shredder 37. Rollers 38 and 39 and cutters 53, 53a reduce the refuse to particles of very small size. These particles are then blown by the combined action of blowers 44 and the large cutter 53 into the first stage of the incinerator.

The first stage of the shredder is provided with rotating rollers 38 and 39 and the second stage includes the large rotating cutter 53 with helical blades attached thereto mating with the stationary cutting blade 53a. The shredder receives the refuse and cuts it into very small particle sizes which burn readily in the incinerator. A reciprocating type of shredder, as shown in FIG. 9, may be employed instead of the rotating shredder shown in FIG. 5. The reciprocating shredder or cutter is provided with a plate 40 having a plurality of slots 41 formed therethrough for receiving the tapered cutting blades 42. The cutting blades are supported by a frame 43 which is attached to a motor driven eccentric (not shown) so that the tapered blades 43 may be moved up above the plate 40 and then punched into the slots 41 to cut up the refuse fed to the plate 40 by the conveyor 36.

One or more blowers 44 mounted to the sides of and over the conveyor 36 are provided for blowing the refuse off of the conveyor 36 into the feeding and pressing rollers 38 and 39 or onto the plate 40. These blowers are supplied with heated air from the duct 45 which is connected to a flue in the brick or asbestos covering 46 of the incinerator. The covering 46 may be provided with a network of flues such as 47 extending around the incinerator to supply hot air to the blowers as may be desirable or necessary. This flue network is provided with an air intake at 47a near the right hand or hot end of the incinerator shown in FIG. 5.

An additional blower 48 is positioned in the duct 49 which is connected to another network of flues in the incinerator lining 46 for blowing air through this network of flues into the incinerator through suitable openings 50 so that preheated air is supplied to the burning zone of the incinerator. This preheated air may be introduced to the incinerator through the pipe 50b shown in FIG. 10. The right hand end of this pipe is connected to the duct 49. The incinerator is provided with a tubular casing 51 which is shown in horizontal position in FIG. 5. However, this casing may be in an inclined or vertical position, as desired.

The rotor 53 which is provided with a plurality of cutter blades or vanes around the circumference thereof is driven at relatively high speed to propel the shredded refuse therefrom into the left hand end of the incinerator where it is ignited by the gas flames from burners 52. The rotor 53 also supplies some air to the incinerator and at the same time propels the refuse into the flame. In cases where the incinerator is arranged in vertical position, the draft from the lower end thereof where the rotor 53 is positioned may be sufficient to draw the finely shredded refuse up through the burning gas. Additional air is supplied to the incinerator through ducts such as duct 49 and openings 50 so that complete combustion of the combustible refuse takes place and the refuse is reduced to a fine ash. This reduction of the refuse to a fine ash may be accomplished by one set of burners 52. However, if the volume of refuse fed to the incinerator is such that complete combustion cannot be accomplished in the first burning zone, then a second and third burning zone, includig the gas burners 52a, may be turned on by supplying gas thereto. Additional air may be supplied to the second burning zone through openings 50a which may be connected to flues similar to the flue and blower arrangement 48 and 49. Suitable thermostats 51a and 51c, shown in FIG. 10, which are of conventional design, may be provided to control the incinerator in accordance with the temperature thereof.

The gases and fine ash from the incinerator are blown from the incinerator into the washer 53' by the draft set up in the incinerator. The washer 53' is provided with a plurality of spray nozzles 54 connected to the water supply line 55. Suitable baffles 56 are provided in the washer chamber so that the gases passing through the water sprays from nozzles 54 have to take a serpentine path through the water. The ash from the incinerator is thus washed down into the sump 57 which is connected to a larger tank in which the ash is allowed to settle so that it may be reclaimed and utilized for uses such as fertilizer.

Any water soluble gases given off in the incinerator will of course also be collected by the water spray and passed to sump 57. The other gases which comprise principally carbon dioxide and some air are passed out of the washer through the pipe 58. If it is found that this gas still has a certain amount of solid matter, then it is fed to the centrifugal extractor 59, shown in FIG. 11. The extractor 59 is provided with an impeller rotor 60 having a plurality of curved vanes around its circumference, as shown. The hollow drive shaft 61 of the impeller is provided with a plurality of holes 62 through which water supplied to this hollow shaft is sprayed outward through the vanes of the impeller. The gas and whatever solid material may be carried thereby is fed to the extractor 59 through the pipe 58 which feeds this gas and solid material into the inside of the rotor 60 from one end thereof. The other end of the impeller is provided with a disc which closes this end. The inside of the housing of extractor 59 is provided with an absorbent layer 63 which may be made of multiple layers of burlap, carpeting or the like. The layer 63 acts to pick up the solid material from the gases as the solid material, gases and water are impelled thereagainst by the rotating impeller 60. This layer 63 may be removed periodically through a removable panel of the extractor and cleaned. Also, if desired, suitable filters such as matted fiber glass may be provided in the outlet duct 58 of the washer and the extractor 59 dispensed with if the amount of solid matter in the gases coming out of the washer is small.

In FIGS. 12 and 13 there is illustrated a compression chamber 65 in the form of a cylinder having a piston 66 therein for use in mixing combustible gas with the finely divided refuse. The piston 66 is connected by the rod 67 to the eccentric 68 which is rotated by a suitable motor (not shown). The finely divided refuse and combustible gas which is at preheated temperature below combustion are introduced into the chamber 73 through the pipe 69 and valve 70 when the valve 72 in the outlet pipe 71 is closed. This refuse and preheated combustible gas is compressed in the chamber 73 after valve 70 is closed and an electrically heated element 73a may be used to ignite the gas and refuse mixture. On the other hand, this compressed gas and refuse may be released through the outlet valve 72 and outlet passage 71 to a suitable burner or incinerator such as shown in FIG. 10. Furthermore, the reduced refuse from the cutter 53 may be dropped into the incinerator which is oil or gas fired, instead of being fed into it as shown in FIG. 5. Thus, the refuse may be dropped into the incinerator burning zone through a chute positioned above this zone so the refuse is fed thereto by gravity or by suitable blowers supplied with preheated air.

While I have shown a preferred embodiment of the invention, it will be understood that the invention is capable of variation and modification from the form shown so that its scope should be limited only by the scope of the claims appended hereto.

What I claim is:

1. In apparatus for disposing of refuse such as garbage and the like, the combination comprising means separating at least some of the noncombustible objects including glass and metallic objects from the refuse, means shredding the combustible parts of the refuse and reducing it to pieces of small size to facilitate burning thereof, an elongated incinerator having an inlet and an outlet, said incinerator having burner means with the flames thereof heating a burning zone, means blowing air into the inlet of said incinerator providing an air flow through said incinerator and propelling said small pieces of refuse mixed with air into the burning zone of said incinerator, said last mentioned means supplying air to the burning zone of said incinerator to promote complete combustion of the small pieces of refuse while it is floating through said burning zone, wall structure forming a washing chamber having a plurality of nozzles for producing a water spray therein, means connecting the outlet end of said incinerator to said washing chamber so that the effluent gases and fine ash from said incinerator pass through the water spray therein, said wall structure including baffles arranged so that said gases are directed in a serpentine path through said chamber, and means connected to said washing chamber in which the water from said spray carrying the fine ash and soluble gases washed out of said effluent is collected.

2. In apparatus for disposing of refuse such as garbage and the like, the combination as set forth in claim 1, further characterized in that said shredding means includes a rotating cutter associated with said air blowing means and propelling the small pieces of shredded refuse into said air flow.

3. In apparatus for disposing of refuse such as garbage and the like, the combination as set forth in claim 2, further characterized in that said incinerator comprises cylindrical wall structure and said burner means of said incinerator comprises a plurality of spaced burners positioned in apertures in said wall structure with the flames of said burners directed toward the center of said cylindrical wall structure.

4. In a method for disposing of refuse such as garbage and the like comprising the steps of (1) loosening the refuse to break up that which is compacted; (2) separating at least some of the noncombustible material from the refuse to be incinerated; (3) compressing the refuse to be incinerated, thereby crushing it and squeezing therefrom a large part of any liquid contained therein; (4) shredding the refuse to be incinerated to reduce it to small particles so that any remaining moisture trapped therein is readily driven out thereof in the subsequent burning of the refuse; (5) firing an incinerator with burners, the flames of which are directed into a burning zone; (6) mixing the small particles of shredded waste with air and suspending them in an air stream; (7) simultaneously causing said air stream to propel the shredded waste mixed with air into said burning zone to burn said waste completely; and (8) washing the smoke and fine ash effluent from said incinerator to remove the fine ash and soluble gas therefrom.

(References on following page)

References Cited

UNITED STATES PATENTS

| | | | |
|---|---|---|---|
| 794,471 | 7/1905 | Smead. | |
| 1,809,819 | 6/1931 | Caller | 110—7 |
| 1,952,389 | 3/1934 | Staples | 110—8 X |
| 1,978,602 | 10/1934 | Sargent | 110—8 |
| 2,042,058 | 5/1936 | Jefferson. | |
| 2,045,115 | 6/1936 | Allen et al. | 110—15 |
| 3,004,721 | 10/1961 | Notzold | 241—5 |

JAMES W. WESTHAVER, *Primary Examiner.*